Patented June 8, 1954

2,680,744

UNITED STATES PATENT OFFICE 2,680,744

PROCESS FOR PREPARING THERAPEUTIC AMINO ACIDS SOLUTIONS

Eugene E. Howe, Bound Brook, N. J., and Irving Putter, Long Island, N. Y., assignors to Merck & Co., Inc., Rahway, N. J., a corporation of New Jersey No Drawing. Application February 24, 1951, Serial No. 212,685

1 Claim. (Cl. 260—309)

This invention relates to the production of amino acids solutions of the type intended for parenteral, rectal and oral administration. More particularly, the invention relates to improved and simplified procedures for preparing such amino acids solutions from acid protein hydrolysates.

In recent years, the value of amino acids solutions in maintaining the proper nitrogen balance and the necessary nutritional state of the body in instances where a large protein loss exists has gained increasing recognition. Various amino acids solutions have been available in the form of acid, basic or enzymatic protein hydrolysates, but in many instances the use of such hydrolysates has not been entirely satisfactory because of objectionable side effects producing nausea and vomiting when administered in large doses or at a fast rate. It has been found, however, that these objectionable side effects can be largely overcome by excluding from such solutions the dicarboxylic acids and certain unidentified toxic materials which normally occur in protein hydrolysates.

One procedure for preparing balanced solutions of the essential amino acids free of objectionable dicarboxylic acids is disclosed in U. S. Patent No. 2,457,820. In accordance with this procedure an acid protein hydrolysate, after removal of excess mineral acid used in hydrolysis, is extracted with a 3- to 5-carbon alcohol such as butanol to effect a separation of the essential monoamino monocarboxylic acids substantially free of dicarboxylic acids. The residual hydrolysate, after removal of dissolved butanol, is then treated with an ion exchange resin which adsorbs the basic essential amino acids but rejects the dicarboxylic acids. These basic essential amino acids are eluted from the resin and combined with the monoamino monocarboxylic acids obtained in the butanol extraction and supplemented with other amino acids, including tryptophane which is destroyed in the acid hydrolysis and the non-essential amino acid glycine, to form a balanced amino acids solution for therapeutic use.

The foregoing procedure, while effectively removing the dicarboxylic acids and making possible the large scale production of improved amino acids solutions is inherently involved and costly to operate due to the extensive equipment required and the technical skill needed in the control of the process.

We have now discovered in accordance with the present invention that it is possible to recover substantially all of the amino acids, including the essential monoamino monocarboxylic acids, the essential basic amino acids and certain nonessential amino acids from an acid protein hydrolysate in a single adsorption and elution step using a cation exchange resin, thus completely eliminating the need for solvent extraction in the preparation of amino acids solutions. During adsorption of amino acids with a cation exchange resin, various unidentified toxic factors pass through the resin and are discarded in the effluent.

As a further embodiment of our invention, we have discovered that the objectionable dicarboxylic acids, notably glutamic acid and aspartic acid, can be removed by means of suitable anion exchange resins either before or after the adsorption and elution of the essential amino acids. These dicarboxylic acids are normally present in substantial amount; a casein hydrolysate, for example, containing on a dry basis about 23% of glutamic acid and about 7% of aspartic acid.

As a still further embodiment of our invention, we have found that it is possible to render ineffective glutamic acid present in the recovered amino acids by autoclaving the amino acids mixture for 24 hours at 120° C. to thereby convert the glutamic acid to physiologically innocuous pyrrolidone carboxylic acid. This autoclaving step can be used as the sole means for eliminating glutamic acid, but can also be advantageously employed as a supplementary step to eliminate residual glutamic acid that may remain in the amino acids mixture due to incomplete adsorption by the anion exchange resin. It should be noted in this connection that aspartic acid is retained more strongly than glutamic acid on the anion exchange resin.

Regarded in certain of its broader aspects, the novel process in accordance with the present invention, for preparing a therapeutic solution of amino acids free of dicarboxylic acids from an acid protein hydrolysate containing various amino acids including essential amino acids and dicarboxylic acids, comprises the steps of adsorbing all the amino acids present in said protein hydrolysate on a cation exchange resin and eluting the adsorbed amino acids with aqueous ammonia, in combination with at least one of the steps for eliminating dicarboxylic acids that comprise adsorbing the dicarboxylic acids by means of an anion exchange resin, and autoclaving an aqueous solution of the amino acids to convert glutamic acid therein to physiologically innocuous pyrrolidone carboxylic acid. The combined procedures in accordance with the present invention are distinctly advantageous not only in providing a more direct and much less expensive process for obtaining dicarboxylic acid free amino acids solutions, but also in providing for the recovery of substantially increased amounts of therapeutically useful amino acids from the initial protein hydrolysate.

In preparing dicarboxylic acid free solutions of amino acids in accordance with the present invention, any protein which is high in essential amino acd content can be used as the starting material. Casein, lactalbumin, fibrin, blood plasma proteins, and yeast proteins are but a few of the common proteins that can be used, and it will be understood that mixtures of two or more protein materials can be employed as well as individual proteins.

Preparation of an acid hydrolysate of the selected protein or protein mixture is effected by conventional hydrolysis procedure, as for example by heating with sulfuric acid, hydrohalic acids, phosphoric acid, sulfonic acids, and the like. The time and temperature of heating in these hydrolysis steps will, of course, vary with different acids and different acid concentrations. By way of illustration, the hydrolysis can effectively be carried out by heating the protein to reflux (100–110° C.) for about 20 hours in sulfuric acid of a concentration of about 20% by volume. After cooling, the hydrolysate is clarified by filtering through a filter aid and is then neutralized, preferably by passing through a column of weakly basic anion exchange resin. It is preferred to dilute the hydrolysate before neutralization so that the residual acid concentration is about 2% or less in order to avoid excessive heating during the neutralization.

The resins that can be used in the neutralization are anion exchange resins deriving their exchange capacity from primary, secondary, and tertiary amine groups, including resins of the phenol formaldehyde type. Suitable resins of these types are "Amberlite IR4B" and "Amberlite IR45," products of Rohm & Haas Co.; "Ionac A300," a product of American Cyanamid Co.; "Duolite A3," a product of Chemical Process Co.; and "Dowex 3," a product of Dow Chemical Co.; and "Deacidite," a product of Permutit Co. These resins are preferably activated before use by treating with sodium hydroxide solution, and washing with water until the effluent wash has a pH of 9.0 or less.

In carrying out the neutralization, the filtered hydrolysate is passed through a column of resin until the pH of the effluent reaches about 5.5, at which point the feed of hydrolysate is stopped and the column is washed with water until the effluent reaches a pH of about 1.5 to displace hydrolysate remaining on the column, this effluent being further treated in the same manner as the main effluent. The neutralization column is then regenerated by treating with sodium hydroxide solution and then washing with water to a pH of 9.0 or less.

It should be noted in this connection that if the neutralization step above described is modified to the extent that the feed of hydrolysate is stopped when the effluent reaches a pH of 9.0, the resin will remove not only sulfuric acid (or other acid used in the hydrolysis) but also substantially all of the dicarboxylic acids present in the hydrolysate. Phenylalanine is also adsorbed by the resin but is removed preferentially by the step of washing the resin with water. This modified procedure constitutes our preferred method for removing dicarboxylic acids in preparing therapeutic solutions of amino acids.

In stopping the feed of hydrolysate in the modified procedure above-mentioned when the effluent reaches pH 9.0, instead of continuing until the effluent reaches pH 5.5, the relative capacity of the resin for adsorption of hydrolyzing acid is reduced. Accordingly, in the modified procedure, we employ an excess of resin, i. e., an amount considerably greater than the amount which would be theoretically required to neutralize excess hydrolyzing acid.

The effluent from the neutralization column may be collected for subsequent treatment but is preferably passed directly through a column of cation exchange resin for adsorption of amino acids. Certain unidentified and toxic impurities pass through the resin and are discarded in the effluent. The resins which can be employed for adsorption of amino acids include strongly acidic resins and particularly those resins which derive their exchange capacity from sulfonic groups such as sulfonated coals and polystyrene and phenol formaldehyde type resins containing sulfonic groups. Suitable resins of this type which have the capacity to adsorb substantially all of the essential amino acids present in the hydrolysate include "Amberlite IR100," "Amberlite IR105," and "Amberlite IR120," products of Rohm & Haas Co.; "Zeokarb," a product of Permutit Co.; "Duolite C–10" and "Duolite C–20," products of Chemical Process Co.; and "Dowex 50," a product of Dow Chemical Co.

The cation exchange resin is preferably activated by treating with dilute sulfuric acid solution and then washing with water until the pH of the wash is 3.5 or higher. The amino acids solution (effluent from the neutralization column) is passed through the resin until test of the effluent indicates that the desired degree of adsorption of essential amino acids on the resin has been reached. The ninhydrin test, for example, readily indicates the presence of amino acids in the effluent.

When the desired adsorption of amino acids on the resin has been reached, the resin is eluted with aqueous ammonia, preferably of about 5–20% concentration, in which operation the amino acids are completely removed from the resin. After the required volume of ammonia has been passed through the resin, a quantity of water generally about equal to the volume of the column is passed through the resin and combined with the ammonia eluate. The resin is then regenerated by treating with dilute sulfuric acid and again washing with water until the pH of the wash is about 3.5 or higher.

The ammonia eluate and wash is then concentrated, preferably by heating in vacuo at a maximum temperature of about 60° C., until the volume has been reduced to provide a solution containing about 10-15% solids. This concentration removes the excess ammonia, together with a substantial amount of water, and gives a concentrated solution having a pH of about 7.0.

If dicarboxylic acids have not previously been removed or if removal of dicarboxylic acids by utilization of an excess of weakly basic anion exchange resin in accordance with our preferred procedure as above described has not been complete, the concentrated solution is then acidified to a pH of about 5.5 and the resulting solution autoclaved at 120° C. for about 24 hours. This treatment converts glutamic acid, the most objectionable dicarboxylic acid present in a protein hydrolysate, to pyrolidone carboxylic acid, a physiologically innocuous acid.

Alternatively, if dicarboxylic acids have not been previously removed, the concentrated amino acids solution after removal of ammonia can be passed through a column of strongly basic anion exchange resin to adsorb the dicarboxylic acids. In general, resins suitable for use in this step include resins which derive their exchange capacity from quaternary amine groups. Resins of this type which are found to be particularly effective include "Amberlite IRA400," "Amberlite XE-75" (products of Rohm & Haas Co.) and "Duolite A-1" and "Duolite A-2" (products of Chemical Process Co.). The resin is preferably activated prior to use by treating with about 5% sodium hydroxide solution, washing with water until the effluent wash has a pH of less than 9, and then converting the resin to an organic acid cycle such as the lactate cycle by treating with a solution of a physiologically innocuous organic acid such as lactic acid, acetic acid, pyrrolidone carboxylic acid, or the like, and again washing with water until the effluent reaches a pH of about 2.5. With proper feed of the amino acids solution through the activated resin, 90% or more of the dicarboxylic acids present therein can be adsorbed on the resin. When optimum adsorption has been reached, the resin can be readily regenerated by repeating the activation procedure above described.

After treatment with a strongly basic anion exchange resin or after autoclaving in accordance with the procedures above-described, the amino acids solution requires only certain finishing steps to provide effective therapeutic solutions. These finishing steps include tyrosine removal, removal of heavy metals, addition of the non-essential amino acid glycine, removal of pyrogens from the resulting solution, addition of dl-tryptophane, adjustment of pH, addition of an antioxidant, and sterilization. All of these finishing steps involve previously known procedures.

The tyrosine removal is effected by contacting the amino acids solution with activated charcoal for an extended period of time, i. e., for about 16 hours at 0-5° C. and then filtering off the charcoal and absorbed and precipitated tyrosine. The removal of heavy metals is readily effected by means of suitable ion exchange resins, and we preferably employ two or more columns of different resins to insure complete removal of heavy metals.

The amino acids solution at this point contains the essential amino acids arginine, histidine, isoleucine, leucine, lysine, methionine, phenylalanine, threonine and valine, i. e., all of the essential amino acids with the exception of tryptophane which is destroyed in the initial hydrolysis. In addition, the solution contains a substantial amount of non-essential amino acids, i. e., an amount generally within the range 0.5 to 1.0 part by weight of non-essential to each part by weight of combined essential amino acids present. Glycine is added as a further source of non-essential nitrogen, the quantity of glycine generally being an amount sufficient to form a solution wherein glycine constitutes about 20-25% of the total solids.

The resulting solution can be treated for pyrogen removal by known procedures such as by autoclaving or by absorption on charcoal. Succeeding finishing steps must then be carried out with pyrogen free equipment and material.

The solution is then diluted with pyrogen free water to provide substantially the amino acids concentration desired in the final solution, and dl-tryptophane is added. It will be understood that at this point other amino acids can also be added individually if it is found by assay that the proportion of such acids provided by the protein hydrolysate does not correspond with the proportions desired in the final amino acids solution. Proper selection of the starting protein or protein mixture will generally avoid the necessity of adding at this point any essential amino acids other than tryptophane. In addition to the tryptophane (and other essential amino acids if necessary), we preferably add at this point a small amount, i. e., 0.1 to 0.6 gram/liter of sodium bisulfite as an antioxidant for the solution.

The basic amino acids present in the solution are then neutralized by addition of a suitable acid such as hydrochloric acid. We prefer to employ as a neutralizing acid, however, a physiologically innocuous organic acid such as acetic acid or lactic acid in accordance with the procedure disclosed and claimed in the pending application of Eugene E. Howe, Serial No. 34,151, filed June 19, 1948. The solution may then be sterilized in bulk as by autoclaving or by filtration and aseptically subdivided. Alternatively, the solution may be subdivided into final distribution containers, rendered oxygen free by nitrogen sparging, after which the containers are sealed and sterilized by autoclaving for 30 minutes at 120° C.

In the finishing operations, the concentration of the final solution is adjusted to provide about 8-12% total solids, depending upon the contemplated use of the amino acids solution. The concentration generally desired is about 10% total solids. In these solutions the total solids are made up essentially of:

40-45% essential amino acids
30% (or less) non-essential amino acids from the hydrolysate (generally about 20 to 30%)
23-25% glycine
7-10% lactate (or other organic acid used to neutralize the basic amino acids)

Our process as above-described provides a very good recovery of amino acids from the starting protein. For example, 1 liter of a 10% amino acids solution may be obtained per 100 grams of ash free, moisture free casein. This is a substantial increase over the yield obtained by the procedure disclosed in United States Patent No. 2,457,820 (involving extraction of the protein hydrolysate with a 3- to 5-carbon alcohol). In the procedure there described, 450 grams of casein yielded 1250 cc. of an 8% amino acids solution (which is equivalent to 1000 cc. of a 10% solution). This substantial increase (4.5 fold increase) in the amount of therapeutic amino acids solution obtainable from a given amount of starting protein, coupled with the relative procedural simplicity of the process herein disclosed, serves to emphasize the outstanding practicability of our improved process for preparing amino acids solutions.

The following examples will show how procedures in accordance with the present invention can be carried out, but it is to be understood that these examples are given by way of illustration and not of limitation.

EXAMPLE 1

Nine kg. of casein (Sheffield high nitrogen casein, 10% moisture, 2% ash) was added to a solution of 63 liters of C. P. concentrated sulfuric acid in 25.2 liters of water in a 30 gallon glass lined still. With agitation the contents of the still were heated to the boiling point (103–106° C.) and allowed to reflux for 20 hours. The hydrolysate was cooled to 35° C. and filtered on a filter pot through a thin layer of charcoal. The still and filter pot were washed with two 15 liter portions of condensed water after which the filtrate and washes were diluted to 79 liters thoroughly mixed and stored in carboys.

Two glass columns 12" x 32" were fitted with perforated plates for support of a granular ion exchange resin and placed in a support in such a way that the effluent from the first column was introduced directly into the second.

To the first (neutralizing) column was added 14 kg. (9 kg. dry weight) of a melamine anion exchange resin (Ionac A300). Through this column was then passed 40 liters of 10% by weight sulfuric acid, 100 liters of water and 120 liters of 5% sodium hydroxide solution. The resin was then washed with sufficient condensed water (approx. 250 liters) to bring the pH of the effluent wash to 8.0 or less.

Into the second (adsorption) column was introduced 18.4 kg. (11 kg. dry weight) of a phenol formaldehyde sulfonic acid resin (Amberlite IR120). This resin was treated with 100 liters of 10% sulfuric acid by weight. The resin was then washed with condensed water (approximately 300 liters) until the pH of the effluent wash was 3.5 or greater.

Twenty-six liters of the filtered casein hydrolysate (representing 2600 grams of ash free, moisture free casein) prepared as above described was passed through the Ionac column at the rate of 1000 cc. per minute. The effluent was passed directly into the second column, samples being withdrawn at 2 minute intervals for pH and sulfate determinations. When the pH of effluent from the Ionac column reached 5.5, the feed was stopped and the resin was then washed with two 15 liter portions (2 voids) of condensed water. The pH of the final wash was 1.5 and the test was slightly positive for the sulfate ion.

After the effluent and wash from the Ionac column had all been introduced into the Amberlite column, the latter was washed with four 15 liter portions of condensed water. As each liter of the final effluent was collected, it was tested for the presence of amino acids by the ninhydrin test and discarded. All tests were negative.

After the adsorption of the amino acids on the Amberlite IR120 column, the resin was eluted with 60 liters of 20% ammonia at the rate of 1000 cc. per minute. The ammonia was followed by 30 liters of condensed water after which the combined eluate and wash was concentrated in vacuo to 14 liters with a maximum temperature of 60° C. The pH of the concentrated eluate was 7.0.

The pH of the amino acid concentrate was adjusted to 5.5 with 30.6 grams of sulfuric acid. The solution was autoclaved at 120° C. for 24 hours, thereby converting the glutamic acid present to pyrrolidone carboxylic acid. Then the solution was cooled to room temperature and agitated with 130 grams of charcoal. With continued agitation the mixture was refrigerated at 0–5° C. for 16 hours. The charcoal and precipitated tyrosine was removed by filtration and washed with two 500 cc. portions of water. A total solids determination on the combined filtrate and wash indicated the presence of 1950 grams of amino acids.

The solution was then treated for removal of heavy metals, histamine and undesirable anions by passing the same through three columns of ion exchange resin. The first column was charged with 250 grams of Zeokarb which was pretreated with hydrochloric acid, followed by washing with water and then with condensed water until the test for chlorides in the effluent was negative. The second column was charged with 350 grams of Amberlite IR4B, adjusted to the acetate cycle by first treating with hydrochloric acid, washing with water, treating with about 10% sodium hydroxide solution, again washing with water until the effluent reached a pH of about 9.4–9.8, then treating the resin with about 3000 cc. of 10% acetic acid solution, and finally washing with water until the pH of the effluent was about 2.8. The third column was also charged with 350 grams of Amberlite IR4B which was adjusted to the hydroxide cycle by treating with hydrochloric acid, water and sodium hydroxide as above-described, the final wash after treatment with sodium hydroxide solution being stopped when the effluent reached a pH of about 9.4–9.6.

The tyrosine free solution (having a volume of about 15 liters) was passed through the three columns in series, followed by a wash of 6–7 liters of condensed water, after which the combined effluent and wash was adjusted to a pH of about 7.8 with 40 cc. of glacial acetic acid. 583 grams of glycine was then added, and the solution was autoclaved at 120° C. for 16 hours. This was followed by the addition of 250 grams of charcoal (Darco G–60), and after agitating the mixture for one hour, it was filtered through a pyrogen free funnel into a pyrogen free 10 gal. bottle. The charcoal was washed with two 500 cc. portions of water and the volume of the final solution was adjusted to 26 liters with pyrogen free water. The solution was then sparged with nitrogen for three minutes for removal of oxygen, after which 13 grams of sodium bisulfite in 100 cc. of water and a solution of 31.2 grams of dl-tryptophane in 13.7 cc. of concentrated hydrochloric acid and 200 cc. of water was added.

The nitrogen sparging was repeated and immediately thereafter the solution was subdivided through a sintered glass lined filter into 500 cc. bottles. The filled bottles were flushed with nitrogen, stoppered, sealed and autoclaved for 30 minutes at 120° C.

Table
COMPOSITION OF FINAL SOLUTION

|  | Preferred | Normal Variation |
|---|---|---|
| Total Solids | 98 gm./l. | 90–110 gm./l. |
| Essential amino acids: |  |  |
| Arginine | 3.5 gm./l. |  |
| Histidine | 1.8 gm./l. |  |
| Isoleucine | 4.0 gm./l. |  |
| Leucine | 9.0 gm./l. |  |
| Lysine | 7.0 gm./l. | (permissible individual variation ±20%) |
| Methionine | 2.3 gm./l. |  |
| Phenylalanine | 2.4 gm./l. |  |
| Threonine | 3.5 gm./l. |  |
| Valine | 5.5 gm./l. |  |
| dl-Tryptophane | 1.2 gm./l. |  |
| Total | 40.2 gm./l. | 40–45%. |
| Non-essential amino acids: |  |  |
| From hydrolysate | 24.9 | 20–30%. |
| Glycine (added) | 23 | 20–25%. |
| Total | 47.9 gm./l. |  |
| Lactic acid | 7 gm./l. | 7–10%. |
| NaHSO₃ | 0.5 gm./l. | 0.1–0.6 gm./l. |
| Miscellaneous components | 2.4 gm./l. |  |
| Aspartic acid | <0.1 |  |
| Glutamic acid | <0.5 |  |
| Tyrosine | <0.3 |  |
| Ash | <1.0 |  |
| NH₄ | <0.5 |  |
| SO₄ | <0.5 |  |
| Cl | <0.5 |  |
| Heavy metals | <50 p. p. m. |  |
| Other data: |  |  |
| Total N₂ (Kjeldahl) | 13.0 gm./l. |  |
| Amino N₂ | 10.5 gm./l. |  |
| Protein (Biuret) | Negative |  |
| pH | 6.3 | 6–7 preferred (5.5–7.5 permissible). |
| (Passes standard tests for Sterility, Toxicity, Pyrogens, Tolerance, Histamine) |  |  |

The yield of final solution was one liter per 100 grams of ash-free moisture-free casein and complied with all requirements of the specifications for a 10% amino acids solution as given in the table.

In addition, the solution passed all standard biological tests for sterility (U. S. P. test), pyrogens, toxicity, tolerance, and blood pressure (histamine) effect.

EXAMPLE 2

The procedure as described in Example 1 was repeated through the step of adsorption of essential amino acids on a cation exchange resin with the exception that Duolite C-10 was employed in place of Amberlite IR120 as the cation exchange resin. 200 cc. of concentrated (ammonia free) eluate from the Duolite C-10 resin containing the essential amino acids was passed through a column of a strongly basic anion exchange resin, Amberlite IRA400, adjusted to the lactate cycle. The resin was prepared by treating a 10" column of Amberlite IRA400, weighing 12 grams, with 250 cc. of 5% sodium hydroxide solution at the rate of 5 cc. per minute, and then washing the column with distilled water until the pH of the effluent wash was less than 9. A solution of 7 cc. of lactic acid (85–90%) in 200 cc. of water was passed through the column after which it was again washed with water to a pH of about 2.5.

The amino acids solution was fed to the column thus prepared at a rate of about 5 cc. per minute, and the effluent, together with additional effluent obtained by washing the column with 50 cc. of water, was collected. Test of the resulting effluent indicated the presence of 1.7 grams of glutamic acid as compared with 3.5 grams of glutamic acid in the amino acids solution charged to the column.

In a similar experiment using the same quantity of resin, the amount of amino acids solution passed through the resin was reduced to 50 cc. In this instance, the glutamic acid concentration of the effluent in solution was only 10% as great as that of the feed solution.

After removing the major portion of the dicarboxylic acids by means of a strongly basic anion exchange resin as above described, the resulting amino acids solution can be treated for tyrosine removal and subjected to the various finishing steps as described in Example 1.

EXAMPLE 3

Casein was hydrolyzed with sulfuric acid as described in Example 1. A portion of this hydrolysate was diluted with sixteen volumes of condensed water, and passed consecutively through two columns of ion exchange resin, the first column containing 450 grams of anion exchange resin (Ionac A300) on the hydroxide cycle and the second column containing 500 grams of cation exchange resin (Amberlite IR120) on the hydrogen cycle. These columns were prepared as described in Example 1. The solution was passed through the two columns in series until the pH of the effluent solution from the Ionac column had decreased to 9.0. At this point a quantity of hydrolystate equivalent to 68 grams of casein had been introduced into the system. The feed was discontinued and the resins were washed in series with 3000 cc. of condensed water. Under these conditions less than 1% of the glutamic and aspartic acid break through the Ionac column to be adsorbed on the Amberlite IR120. The latter resin was then eluted and the eluate concentrated for ammonia removal, adjusted to pH 5.5 with sulfuric acid, refrigerated and treated with charcoal for tyrosine removal and subjected to further finishing operations as described in Example 1. The yield of the final solution thus obtained was 550 cc. or approximately 0.81 liter per 100 grams of casein.

Various changes and modifications in the foregoing procedure will occur to those skilled in the art, and to the extent that such changes and modifications are embraced by the appended claim, it is to be understood that they constitute part of our invention.

We claim:

The process for recovering in enhanced yield from an acid protein hydrolysate a solution of the essential amino acids arginine, histidine, isoleucine, leucine, lysine, methionine, phenylalanine, threonine, and valine which is substantially free of dicarboxylic acids, that comprises contacting said acid protein hydrolysate with an excess of a weekly basic anion exchange resin deriving its exchange capacity from primary, secondary, and tertiary amine groups to simultaneously neutralize said hydrolysate and adsorb dicarboxylic acids, then contacting the neutralized solution with a strongly acidic cation exchange resin deriving its exchange capacity from sulphonic groups to effect separation of all of said essential amino acids by adsorption on said resin from toxic impurities which remain in the effluent solution, eluting the resin with aqueous ammonia, and concentrating the eluate to remove ammonia thereby obtaining a solution of said essential amino acids which can be used directly in preparing a parenteral amino acids solution.

References Cited in the file of this patent

UNITED STATES PATENTS

| Number | Name | Date |
|---|---|---|
| 2,413,791 | Shafor | Jan. 7, 1947 |
| 2,434,715 | Olcott et al. | Jan. 20, 1948 |
| 2,462,597 | Block | Feb. 22, 1949 |
| 2,480,654 | Howe et al. | Aug. 30, 1949 |
| 2,510,980 | Jacobs et al. | June 13, 1950 |
| 2,528,047 | Fitch | Oct. 31, 1950 |
| 2,586,295 | Brown et al. | Feb. 19, 1952 |
| 2,590,209 | Roberts | Mar. 25, 1952 |

OTHER REFERENCES

Freudenberg et al., Naturwissenschaften, vol. 30, p. 87 (1942).

Englis et al., Ind. & Eng. Chem., vol. 36, pp. 604–9 (1944).

Block et al., "Amino Acid Composition of Proteins and Foods" (Thomas), pp. 292–3 (1945).

Block Archives of Biochem. vol. 11, pp. 235, 247 (1946).